United States Patent [19]
Waligorski

[11] Patent Number: 5,269,072
[45] Date of Patent: Dec. 14, 1993

[54] COFFEE ROASTER

[75] Inventor: Gordon J. Waligorski, Carroll County, Ind.

[73] Assignee: Felknor International, White, Ind.

[21] Appl. No.: 886,497

[22] Filed: May 22, 1992

[51] Int. Cl.$^5$ .................................. F26B 17/00
[52] U.S. Cl. .................................... 34/57 E; 99/286; 34/48; 34/233; 34/225; 34/57 R
[58] Field of Search ................. 219/400; 34/22, 218, 34/57 R, 57 E, 57 A, 57 B, 10, 225, 233, 48, 46, 30-31; 99/286

[56] References Cited

U.S. PATENT DOCUMENTS

| | | | |
|---|---|---|---|
| 2,581,148 | 1/1952 | Scull, II et al. | 99/68 |
| 2,639,133 | 5/1953 | Clary | 263/33 |
| 2,712,501 | 7/1955 | Hale et al. | 99/71 |
| 3,153,377 | 10/1964 | Bosak | 99/286 |
| 3,329,506 | 7/1967 | Smith, Jr. | 99/68 |
| 3,345,181 | 10/1967 | Smith, Jr. | 99/68 |
| 3,756,139 | 9/1973 | Wolens | 99/323.5 |
| 3,964,175 | 6/1976 | Sivetz | 34/57 A |
| 4,169,164 | 9/1979 | Hubbard et al. | 426/467 |
| 4,196,342 | 4/1980 | Chailloux | 99/286 |
| 4,271,603 | 6/1981 | Moore, III | 99/286 |
| 4,322,447 | 3/1982 | Hubbard | 426/467 |
| 4,325,191 | 4/1982 | Kumagai et al. | 34/54 |
| 4,326,114 | 4/1982 | Gerling et al. | 219/10.55 A |
| 4,484,064 | 11/1984 | Murray | 219/400 |
| 4,494,314 | 1/1985 | Gell, Jr. | 34/57 E |
| 4,512,247 | 4/1985 | Friedman | 99/323.5 |
| 4,642,906 | 2/1987 | Kaatze et al. | 99/286 |
| 4,683,666 | 8/1987 | Igusa et al. | 34/225 |
| 4,698,916 | 10/1987 | Färber | 34/57 E |
| 4,702,158 | 10/1987 | Ishihara | 99/323.5 |
| 4,727,798 | 3/1988 | Nakamura | 99/323.9 |
| 4,737,376 | 4/1988 | Brandlein et al. | 426/467 |
| 4,748,903 | 6/1988 | Fereshetian | 99/340 |
| 4,763,568 | 8/1988 | Kiczek | 99/323.5 |
| 4,780,586 | 10/1988 | Le Viet et al. | 219/10.55 A |
| 4,860,461 | 8/1989 | Tamaki et al. | 99/286 |
| 4,871,901 | 10/1989 | Igusa et al. | 99/286 |
| 4,881,457 | 11/1989 | Lyga et al. | 99/323.5 |
| 4,895,308 | 1/1990 | Tanaka | 99/286 |
| 4,925,682 | 5/1990 | Miya | 426/87 |
| 5,068,979 | 12/1991 | Wireman et al. | 34/57 R |
| 5,083,502 | 1/1992 | Enomoto | 99/286 |

Primary Examiner—Henry A. Bennet
Assistant Examiner—Denise L. F. Gromada
Attorney, Agent, or Firm—Pitts & Brittian

[57] ABSTRACT

An improved coffee roaster (10) for roasting a selected volume of coffee beans in a relatively quick and efficient manner. A roasting cavity (66) is provided for receiving and roasting a selected volume of green coffee beans. A timer (158) is provided for controlling the roasting time. A heating coil (32) is provided for generating heat to roast the coffee beans. A motor (24) drives a fan (30), which forces air through the heating coil (32) and toward the roasting cavity (66). Slots (76) defined by the roasting cavity (66) direct the heated air into the roasting cavity (66) such that the coffee beans are agitated and roasted. Chaff is evacuated with the air through the opening (74) in the top of the roasting cavity (66). A chaff collector (20) is provided for collecting the chaff evacuated while allowing the escape of air.

17 Claims, 4 Drawing Sheets

COFFEE ROASTER

DESCRIPTION

1. Technical Field

This invention relates to the field of coffee roasters. More specifically, this invention relates to a device which may be used for roasting coffee beans in small quantities for in-home use, the roasting being accomplished by means of heated air being circulated through the coffee beans until a desired amount of roasting has been accomplished.

2. Background Art

In the field of roasting coffee beans it is well known that the flavor within the coffee beans begins to diminish from the time they are roasted. Therefore, it can be seen that more flavorful coffee may be derived from coffee beans which are roasted and ground immediately before brewing. It is also well known that green coffee beans retain their flavor for up to ten years. Due to the longevity of the green coffee beans, it can be seen that storing the green coffee beans and roasting them only as they are needed for brewing will result in the maximum flavor yield.

For home use, then, it is desirable to have a coffee bean roaster capable of roasting a small amount of coffee beans at a single time. With such a coffee roaster, one could purchase a supply of green coffee beans to be roasted when needed. The green coffee beans would retain their flavor, thereby yielding consistently flavorful coffee. With pre-roasted coffee such as that purchased in a store, the last volume of coffee brewed will inherently be less flavorful than the first volume of coffee.

There have been several inventions directed toward the roasting of coffee beans. Typical of the art are those devices disclosed in the following U.S. Patents:

| U.S. Pat. No. | Inventor(s) | Issue Date |
| --- | --- | --- |
| 2,581,148 | W. S. Scull, 2nd, et al. | 01-01-1952 |
| 2,639,133 | P. T. Clary | 05-19-1953 |
| 2,712,501 | J. F. Hale, et al. | 07-05-1955 |
| 3,329,506 | H. L. Smith, Jr. | 07-04-1967 |
| 3,345,181 | H. L. Smith, Jr. | 10-03-1967 |
| 3,964,175 | M. Sivetz | 06-22-1976 |
| 4,169,164 | M. H. Hubbard, et al. | 09-25-1979 |
| 4,322,447 | M. R. Hubbard | 03-30-1982 |
| 4,326,114 | J. E. Gerling, et al. | 04-20-1982 |
| 4,484,064 | J. L. Murray | 11-20-1984 |
| 4,737,376 | L. S. Brandlein, et al. | 04-12-1988 |
| 4,780,586 | T. Le Viet, et al. | 10-25-1988 |
| 4,925,682 | I. Miya | 05-15-1990 |

Of these devices, only two devices have been devised specifically for in-home use. Every other device disclosed is for continuous roasting of coffee beans for large-scale productions. These devices are not practical for in-home use due to the size of the devices, along with other practical considerations. Large quantities of coffee beans are required in order to operate these devices efficiently, which is opposed to the objects of the present invention.

The patents which disclose devices for use in a home include U.S. Pat. No. 4,484,064 (the '064 patent) issued to Murray and U.S. Pat. No. 4,925,682 (the '682 patent) issued to Miya. However, the '682 patent requires the application of direct heat, such as by a gas heater. It has been proven through experimentation that such roasting methods are inefficient, as uneven roasting may occur. Further, over-roasting may occur with the application of direct heat.

The '064 patent uses a preferred method of roasting coffee beans. That preferred method is by the application of heated air. Such a method is old in the art, as can be evidenced by at least the U.S. Pat. No. 2,639,133 ('133) patent issued to P. T. Clary on Aug. 26, 1949 and the U.S. Pat. No. 3,964,175 ('175) patent issued to M. Sivetz on Jun. 22, 1976. Though the '064 patent discloses the preferred heating medium, it does not solve the problems of coffee roasters designed for small volume, non-continuous roasting.

One such problem is the collection of chaff. Chaff is produced during roasting as the protective outer coating of each bean is dried and flakes off. The presence of chaff within the coffee beans causes adverse taste effects such as bitterness. Chaff within the heating coils causes an increased risk of fire. Although spoken to in the '064 patent, the chaff may still be retained within the volume wherein the beans are roasted. The chaff may be so retained if the chaff is larger than the openings defined by the screen 65 but does not stick to the screen. Therefore, the bitter taste may be present in the brewed coffee.

If the chaff is minute enough to pass through screen 65, screens 22 and 34 are provided to catch them and prevent them from entering the roasting vessel. However, by retaining the minute particles of chaff at this location, increased fire hazards are created. This is apparent from the location of the screens 22 and 34 immediately above the heating coils. It has been proven through testing that the buildup of chaff particles at the heating coil will cause smoke, and occasionally fire, within the coffee roaster.

Another device for roasting coffee beans in the home is the AromaRoast Electric Coffee Bean Roaster manufactured by Melitta, Inc., 1401 Berlin Road, Cherry Hill, N.J., 08003. However, this device has not proven to yield the desired results of efficiently roasted coffee beans. Several problems have been associated with the coffee bean roaster, including excessive noise created during the roasting process.

The use of heated air to roast coffee beans in a non-continuous manner for small volumes of beans is similar to that of hot air corn popping devices. Typical of the art in this field are the following U.S. Patents:

| U.S. Pat. No. | Inventor(s) | Issue Date |
| --- | --- | --- |
| 3,756,139 | J. Wolens | 09-04-1973 |
| 4,512,247 | A. M. Friedman | 04-23-1985 |
| 4,702,158 | N. Ishihara | 10-27-1987 |
| 4,727,798 | S. Nakamura | 03-01-1988 |
| 4,748,903 | S. Fereshetian | 06-07-1988 |
| 4,763,568 | C. R. Kiczek | 08-16-1988 |
| 4,881,457 | T. M. Lyga, et al. | 11-21-1989 |

Several devices for popping corn have been tested for roasting coffee beans with varied results. The best results have been obtained from using corn popping devices such as that disclosed in the U.S. Pat. No. 4,702,158 patent ('158) issued to N. Ishihara. However, several distinct problems are inherent in using these devices for roasting coffee beans.

Devices for popping corn are designed to produce heat at a lower temperature than required for roasting coffee beans. Therefore, longer roasting times are required and the motors of the corn popping devices tend to overheat, smolder, or even ignite after several roasting periods. Also, the longer time required to roast the coffee beans reduces the flavor of the coffee beans. It is well known in the art that coffee beans yield more flavor with reduced roasting times.

Another problem associated with the use of corn poppers is the lack of chaff collecting means. As discussed previously, it is desirable for culinary as well as safety reasons to remove as much chaff as possible. None of the prior art references cited provides a suitable method for collecting chaff.

As disclosed in many of the corn popping devices, and in the devices for roasting coffee beans wherein hot air is used, the hot air is typically introduced through the bottom of the container for popping corn or roasting beans. It has been proven through testing that the most efficient roasting is accomplished through the introduction of heated air around the periphery of the coffee bean retainer.

Further, for the most effective removal of chaff, it has been proven that the introduction of heated air should create turbulence within the coffee bean retainer. For those corn poppers wherein slots are provided in the side wall, a circular motion is created, but the air may easily move upward without creating turbulence over the entire receptacle, especially in the center. In these embodiments, chaff would be able to circulate around the bottom of the coffee bean retainer without being forced out.

Therefore, it is an object of this invention to provide a means for roasting a small volume of coffee beans in a non-continuous manner.

It is also an object of the present invention to provide a means for roasting a small volume of coffee beans while providing a means for the collection of chaff produced during the roasting process.

Another object of the present invention is to provide a device for roasting a small volume of coffee beans in a short period of time.

Still another object of the present invention is to provide a device for efficiently roasting coffee beans by means of heated air being passed over the surfaces of the individual coffee beans.

DISCLOSURE OF THE INVENTION

Other objects and advantages will be accomplished by the present invention which serves to roast a small volume of coffee beans in a non-continuous manner and in a short period of time. Moreover, in the preferred embodiment the improved coffee roaster is designed to collect a substantial portion of the chaff produced in the roasting process.

A roasting assembly is provided for passing heated air around the individual coffee beans at a temperature such that the desired roasting may be accomplished within a period of three to five minutes. The roasting assembly includes at least an air induction means, a heating means, and a housing. The air induction means includes a motor to which a selected fan is attached. The motor is fixed to the roasting assembly housing such that when operated, the fan will force air through the heating means. The heating means includes a heating coil readily available to one skilled in the art. The heating means is positioned above the fan such that substantially all of the air pushed by the fan through the openings will be heated by the heating means. The heated air is then passed toward a roasting cavity. An upper portion of the roasting assembly housing is provided to receive the roasting cavity, and further to direct the heated air toward the roasting cavity.

The roasting assembly is carried by a base assembly such that the improved coffee roaster may be safely placed on a counter top or other selected support surface intended for such use.

To aid in the draw of air through the base, a plurality of feet members is provided to elevate the base member above the support surface. The feet members may also serve to dampen noise and vibration caused by the improved coffee roaster during normal operation. Further, the feet members may serve as electrical insulators between the improved coffee roaster and the support surface in the event of an electrical short in the wiring of the improved coffee roaster.

A housing member is provided to protect the components of the improved coffee roaster. The housing of the preferred embodiment is configured to be spaced away from the internal components such that a volume of air is provided to serve as an insulator. By providing such a configuration, it will be seen that the improved coffee roaster may be more easily handled after a period of roasting. The housing member is attached to either the roasting assembly or the base member. An opening defined by the bottom end of the side wall is configured to closely receive the base member. The top member defines an opening configured to closely receive the roasting cavity, the opening being used for the entry and exit of coffee beans.

A roasting cavity is provided for receiving the coffee beans for roasting. A cup member is dimensioned to be received within the upper portion of the roasting assembly housing such that the air forced through the heating means is directed toward the cup member. A plurality of openings is defined along the side wall of the preferred embodiment to allow the entrance of heated air. The openings defined by the side wall are angled from the bottom of the slot to the top in a direction coincident to the direction of air flow in order that the air forced into the cup will be forced in a downward and circular direction, thereby creating turbulence within the bottom of the cup member. The turbulence created will cause the coffee beans to be agitated, and will also force the chaff out of the cup member. A screen may be provided to catch any chaff which is not evacuated through the upper end of the cup member during the roasting process. The screen defines openings of a size sufficient to allow the passage of air, yet small enough to catch small particles of chaff. A coating may be applied to the interior of the cup member and the screen, if incorporated, to prevent the sticking of coffee beans.

A chaff collector means is provided for collecting chaff forced out of the roasting cavity during the roasting process. The chaff collector means of the preferred embodiment includes a separator member and a cover member. The separator member serves to separate the chaff from the evacuating air, to collect the chaff, and further to allow for the evacuation of air from the improved coffee roaster. The cover member serves to direct the chaff into the collection volume of the separator member and to allow for further evacuation of air from the improved coffee roaster.

A thermostat may be provided for limiting the temperature within the housing to a selected temperature. The thermostat is positioned between the heating coil and the fan such that if the improved coffee roaster begins to overheat, heated air will be forced downward toward the thermostat. Thus, the thermostat will detect an increase in temperature and will automatically deactivate at least the heating means.

A timing means may be provided for several purposes. First, the timing means can control the roasting time such that each load of coffee may be roasted to a consistent degree. Further, the timing means serves to limit the roasting time to prevent overheating from prolonged usage. The timing means may also serve as an ON/OFF switch.

A handle is provided for the ease of lifting and tilting the improved coffee roaster. It can be seen that the coffee beans are evacuated from the preferred embodiment by tilting the improved coffee roaster, thereby the provision of a handle aids such removal. Obviously, a handle also aids in otherwise lifting and/or moving the improved coffee roaster.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

An improved coffee roaster incorporating various features of the present invention is illustrated generally at 10 in the figures. The improved coffee roaster 10 is designed for roasting a small volume of coffee beans in a non-continuous manner and in a short period of time. Moreover, in the preferred embodiment the improved coffee roaster 10 is designed to collect a substantial portion of the chaff produced in the roasting process.

Figure 1:
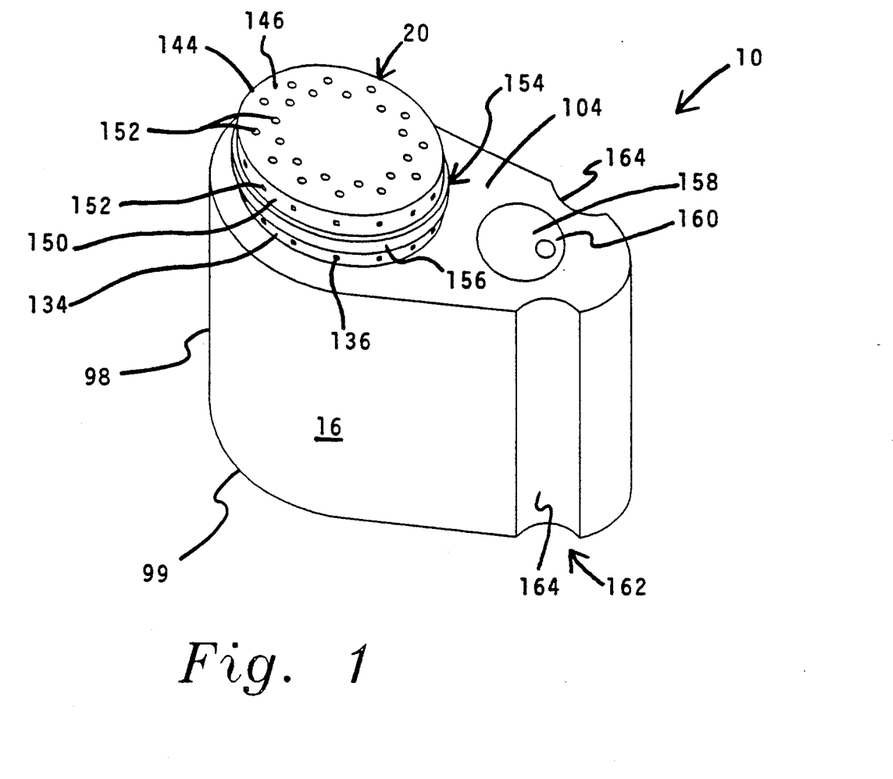
FIG. 1 is a perspective view of the improved coffee roaster constructed in accordance with several features of the present invention.
Figure 2:
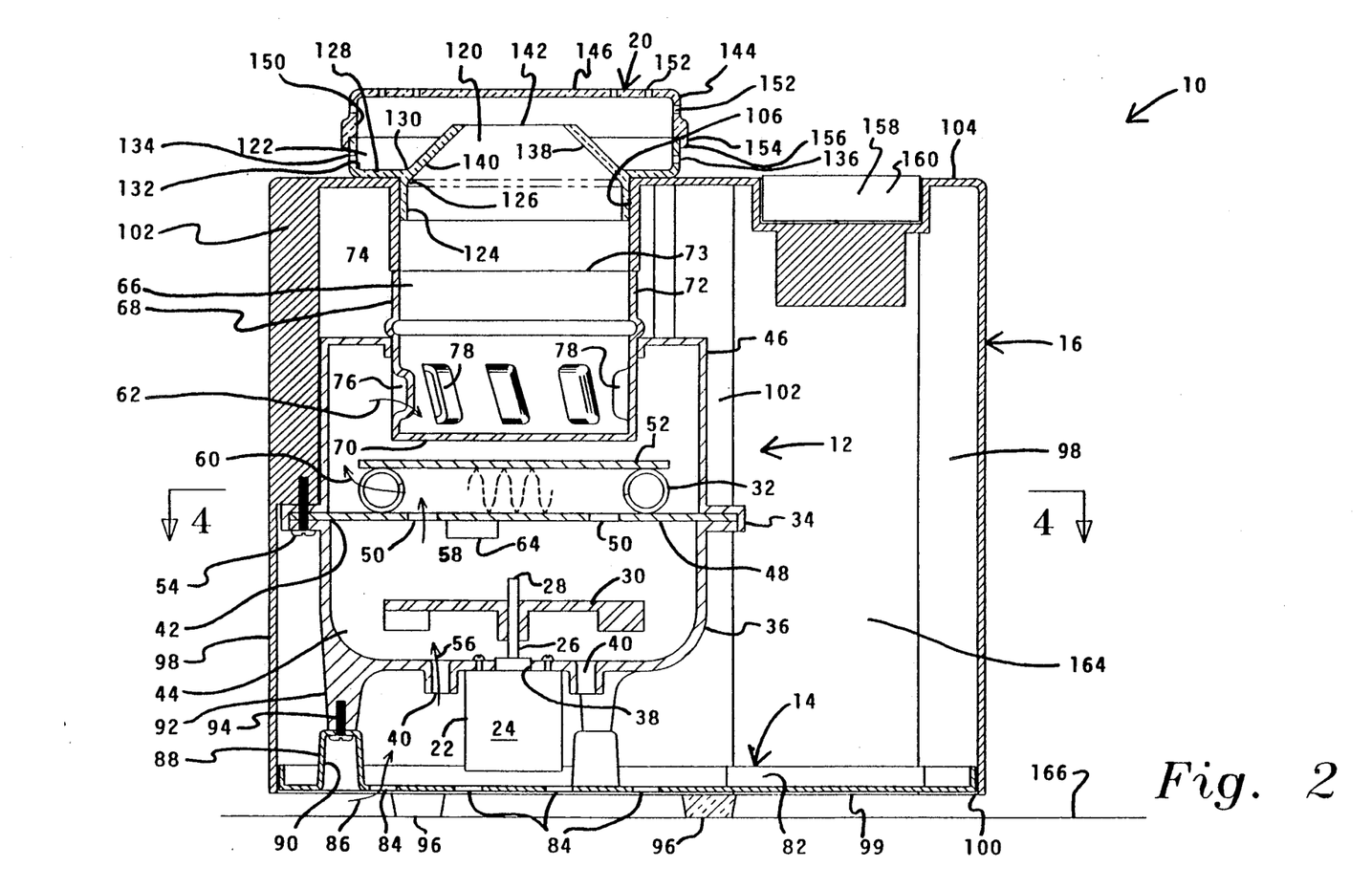
FIG. 2 illustrates a side elevation view, in section, of the improved coffee roaster of FIG. 1.
Figure 3:
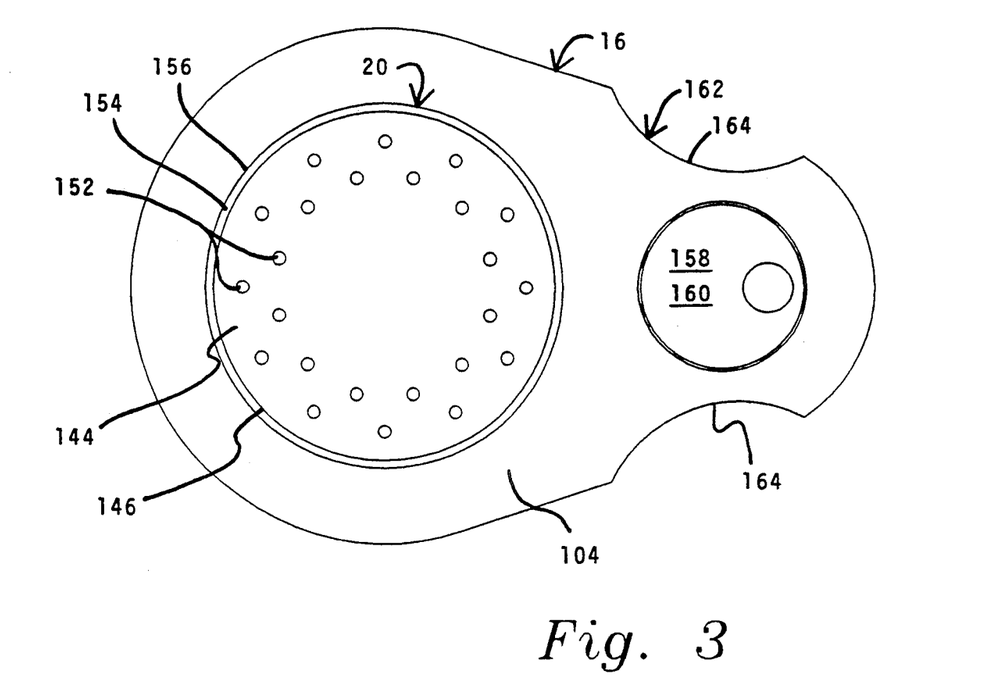
FIG. 3 is a top plan view of the improved coffee roaster of FIG. 1.

The preferred method of roasting the green coffee beans is by the passage of heated air around the individual coffee beans at a temperature such that the desired roasting may be accomplished within a period of three to five minutes. To this end, a roasting assembly 12 is provided. The roasting assembly 12 is comprised of at least an air induction means 22 and a heating means 32. As best shown in FIG. 2, the roasting assembly 12 is mounted within a housing 34.

In the preferred embodiment, the air induction means 22 and the heating means 32 are selectively and independently operable. The air induction means 22 serves to pass heated air through the roasting assembly 12 when the heating means 32 is activated. However, when the heating means 32 is inactive, the air induction means may be independently activated to cool freshly roasted coffee beans. This use of the air induction means 22 speeds the cooling process, which is necessary prior to grinding.

In the preferred embodiment, the air induction means 22 includes a motor 24 to which a selected fan 30 is attached. The motor 24 is fixed to the exterior of a lower portion 36 the roasting assembly housing 34 in such a manner as to prevent unselected movement of the motor 24 with respect to the roasting assembly housing 34. The shaft 26 of the motor 24 is received through an opening 38 defined by the roasting means housing 34 such that the fan 30 may be affixed thereto on the inner volume 44 of the roasting assembly housing 34. At least one opening 40 is defined by the housing lower portion 36 for the passage of air as the motor 24 is operated and the fan 30 circulates air.

A divider plate member 48 is provided to substantially cover an opening 42 defined by the housing lower portion 36. The divider plate member 48 serves several functions. Of these functions is included the definition of a volume 44 within the housing lower portion 36. Further, the divider plate member 48 defines at least one opening 50 for the passage of air directed from the fan 30 toward the heating means 32. The heating means 32 is affixed to the divider plate member 48 of the preferred embodiment. A temperature sensing means 64 is also attached to the divider plate member 48, preferably within the volume 44 defined by the housing lower portion 36.

Figure 4:
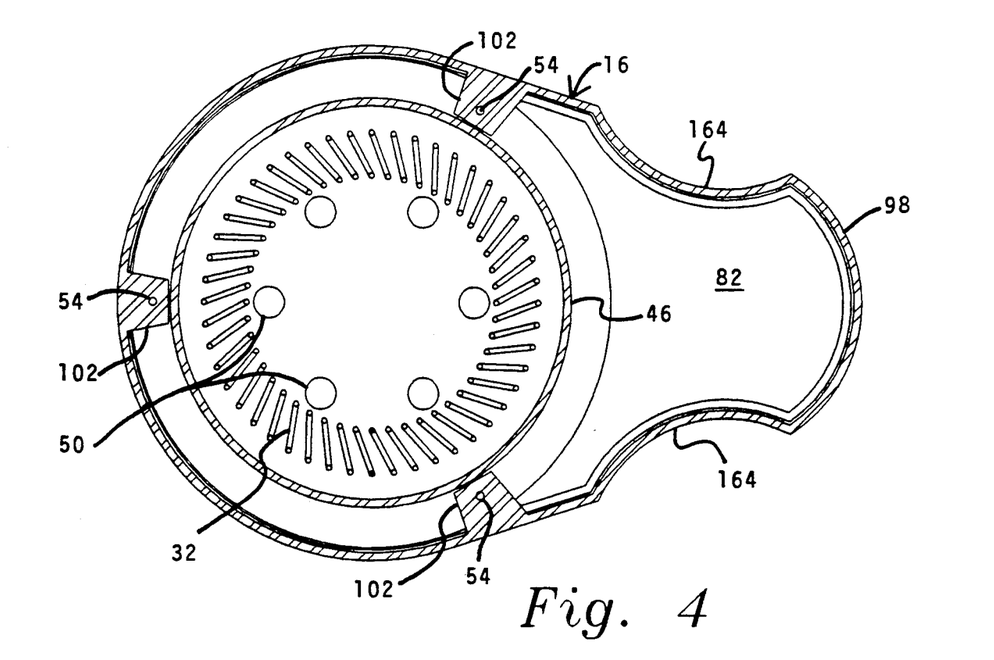
FIG. 4 illustrates a top plan view, in section, of the present invention taken at 4—4 of FIG. 2.

The heating means 32 of the preferred embodiment is a heating coil readily available to one skilled in the art. Other comparable heating means may be used as well. The heating coil 32 depicted in the figures (see also FIG. 4) defines a circular configuration. The openings 50 defined by the divider plate member 48 are so defined such that as air is directed through each, the air will be directed to a point within the circular configuration of the heating coil 32. An air flow diverting member 52 (plate member 52) is positioned above the heating means 32 such that air received through the openings 50 is forced through the heating coil 32. Thus substantially all of the air pushed by the fan 30 through the openings 50 will be heated by the heating means 32. The heated air is then passed toward a roasting cavity 66.

The heating coil 32 of the preferred embodiment may have a power rating of 1200 to 1300 Watts. For roasting cavities 66 with a capacity to roast enough coffee beans to make eight (8) cups of coffee, a 1200 Watt heating coil has proven sufficient. For roasting cavities 66 with a capacity to roast enough coffee beans to make twelve (12) cups, however, it has been found that a 1300 Watt heating coil is more efficient. With improvements in heating coils, or with differing configurations of coffee roasters, these standards may differ. For instance, improved heating coils with 900 and 1000 Watt power ratings may work equally as well for the above-described volumetric capacities, respectively. Therefore, this disclosure is not intended to limit the heating means to a heating coil with a power rating of 1200 to 1300 Watts.

In the preferred embodiment, the divider plate member 48 and the air flow diverting member 52 are fabricated from a heat resistant material such that deformation of either does not occur during normal operation of the improved coffee roaster 10. The temperature of the heating coil 32, and subsequently the divider plate member 48 and the air flow diverting member 52, may rise to approximately 500° F. The latter members 48,52 must be able to withstand such temperatures. A material found to be suitable for such purposes is mica, however, this disclosure is not intended to limit the divider plate member 48 or the air flow diverting member 52 to this material.

An upper portion 46 of the roasting assembly housing 34 is provided to receive the roasting cavity 66, and further to direct the heated air toward the roasting cavity 66. The upper and lower portions 36,46 of the roasting assembly housing 34 and the divider plate member 48 are attached in a conventional method such as with screw-type fasteners 54.

Thus it can be seen that air is pulled into the housing lower portion 36 through openings 40 as depicted by arrow 56. The air is then forced through openings 50 as depicted by arrow 58 and through the heating means 32 as depicted by arrow 60. The heated air is then directed into the roasting cavity 66 as depicted by arrow 62.

The roasting assembly 12 is carried by a base assembly 14 such that the improved coffee roaster 10 may be safely placed on a counter top or other selected support surface 166 intended for such use. A base member 82 is provided for so attaching the roasting assembly 12. As shown in FIG. 2, a plurality of divider legs 85 is provided for attaching the roasting assembly 12 to, and separating it from, the base member 82.

Each leg 88 may comprise, as shown, an upwardly extending recess 90 defined by the base member 82 and a cooperating downwardly extending portion 92 of the roasting assembly housing 34. The individual leg components 90,92 may be attached by a screw member 94 as shown, or with any selected connecting device to achieve a similar result. The legs 88 are dimensioned to separate the roasting assembly 12 from the base assembly 14 such that especially the motor 24 is unobstructed, and further to create an air barrier between the roasting assembly 12 and the base 14. The air barrier provides an insulating layer to protect the base 14 from heat generated by the roasting assembly 12.

In the preferred embodiment, the base member 82 defines at least one opening 84 for the passage of air when the motor 24 and fan 30 are operated. As the fan 30 is operated, the air drawn through openings 40 is first drawn through the openings 84 defined by the base member 82, as depicted by arrow 86.

To aid in the draw of air through openings 84, a plurality of feet members 96 is provided to elevate the base member 82 above the support surface 166. It will be seen that the feet members 96 may also serve to dampen noise and vibration caused by the improved coffee roaster 10 during normal operation. To this end, the feet members 96 are preferably fabricated from a resilient material such as rubber. By fabricating the feet members 96 from a material such as rubber, it will be seen that the feet members 96 will further serve as electrical insulators between the improved coffee roaster 10 and the support surface 166 in the event of an electrical short in the wiring of the improved coffee roaster 10.

A housing member 16 is provided to protect the components of the improved coffee roaster 10. The housing 16 of the preferred embodiment is configured to be spaced away from the internal components such that a volume of air is provided to serve as an insulator. By providing such a configuration, it will be seen that the improved coffee roaster 10 may be more easily handled after a period of roasting.

The housing member 16 is attached to either the roasting assembly 12 or the base member 82. In the preferred embodiment, the housing member 16 is connected to the roasting assembly housing 34 by way of the fasteners 54 used to secure the lower and upper portions 36,46 of the roasting assembly housing 34 and the divider plate member 48. To facilitate such securement, tabs 102 may be defined by the housing member side wall 98. Other conventional connecting means may be used in addition to or in lieu of that described.

An opening 100 is defined by the bottom end 99 of the side Wall 98, the opening 100 being configured to closely receive the base member 82. A top member 104 defines an opening 106 configured to cooperate with a top opening 74 defined by the roasting cavity 66, the openings 106,74 being used for the entry and exit of coffee beans. In the preferred embodiment, the side wall 98 and top member 104 are integrally formed, as shown in the figures.

The housing 16, the lower and upper portions 36,46 of the roasting assembly housing 34, and the base member 82 of the preferred embodiment are each fabricated from a heat resistant material. It will be understood that a heat resistant material is necessary to prevent melting of the individual members and thereby to forego safety hazards. One material found to be suitable is a glass-filled polyester material, but this disclosure is not intended to limit the individual members to fabrication thereof.

A roasting cavity 66 is provided for receiving the coffee beans for roasting. In the preferred embodiment, a cup member 68 is provided. The cup member 68 is dimensioned to be received within the roasting assembly housing upper portion 46 such that the air forced through the heating means 32 is directed toward the cup member 68. As shown in the figures, the cup member 68 defines a substantially flat bottom member 70 and a side wall 72 which defines an opening 74 at the top end 73.

In the preferred embodiment, the ratio between the height of the side wall 72 and the diameter of the bottom member 70 is approximately 3:5. For example, a cup member 68 designed to roast enough beans to make twelve (12) cups of coffee has a side wall 72 of approximately 2½ inches and a diameter of approximately 1½ inches. These dimensions and the ratio between the two are purely illustrative and may be altered to vary the roasting quality of the improved coffee roaster 10, especially for different volumes of coffee beans.

A plurality of openings 76 is defined along the side wall 72 of the preferred embodiment. The openings 76 may be defined in the bottom member 70, but more desirable results have been attained with openings 76 in the side wall 72. In the preferred embodiment, the openings 76 defined by the side wall 72 are angled from the bottom of the opening 76 to the top in a direction coincident to the direction of air flow. Each opening 76 may be defined by forming a linear opening in the side wall 72 and deforming a portion of the side wall 72, proximate one side 78 of the opening 76, toward the center of the cup member 68. Therefore, a slotted opening 76 is formed, the opening 76 substantially lying in a plane passing through the center of the cup member 68. It will be seen that the air forced into the cup member 68 will be forced in a downward and circular direction, thereby creating turbulence within the bottom of the cup member 68. The turbulence created will cause the coffee beans to be agitated, and will also force the chaff out of the cup member 68.

Figure 5:
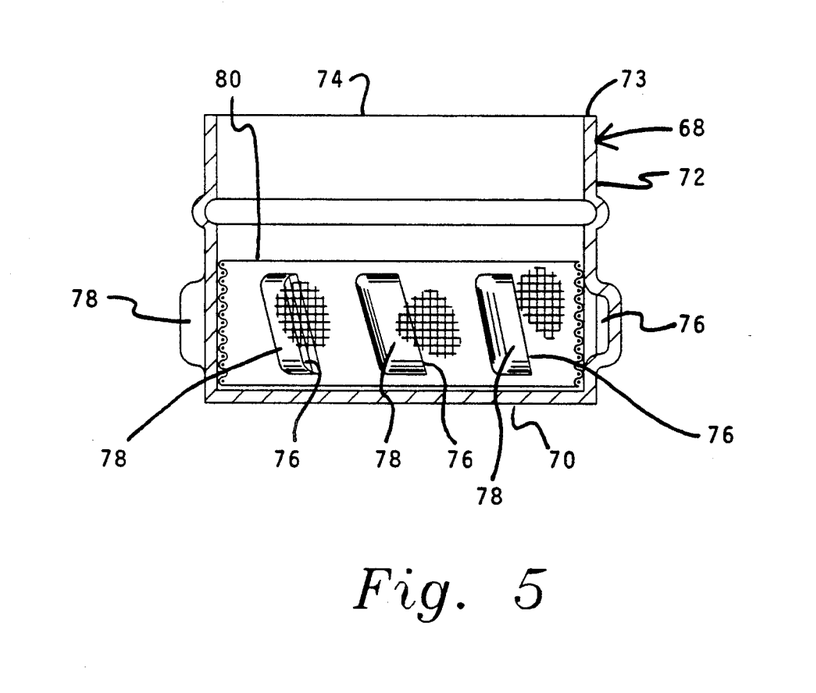
FIG. 5 illustrates a side elevation view, in section, of an alternate embodiment of the roasting cup member of the present invention.

With the openings 76 being defined in the side wall 72 of the cup member 68, it may be desirable to prevent chaff from entering the roasting assembly 12. To this end, as shown in FIG. 5, a screening member 80 (screen 80) may be provided to catch any chaff which is not evacuated through the opening 74 defined by the upper end 73 of the cup member 68 during the roasting process. The screen 80 defines openings of a size sufficient to allow the passage of air, yet small enough to catch small particles of chaff. It will be seen that in this embodiment, the openings 76 are preferably defined by the outward deformation of the slots to allow or a close engagement between the screen so and the interior of the cup member 68.

A coating may be applied to the interior of the cup member 68 and the screen, if incorporated, to prevent the sticking of coffee beans. During the roasting process, coffee beans have been known to produce oil, which may cause the beans to stick to the cup member 68. Coffee beans may stick to the cup member 68 if the roasting process is allowed to continue after the beans have been sufficiently roasted. One type of non-stick coating found to be suitable is a fluorocarbon coating. Other coatings may be suitable as well, and it is for this reason that the present disclosure is not intended to limit the coating to a fluorocarbon-type material.

It may be desirable to remove the cup member 68 for cleaning or other desired purpose. Though not shown, it is foreseeable that a removable sleeve may be incorporated within the housing member 16 in order to facilitate the removal of the cup member 68. The removable sleeve would include at least the portion of the housing 16 shown to hold the cup member 68 in position.

Figure 6:
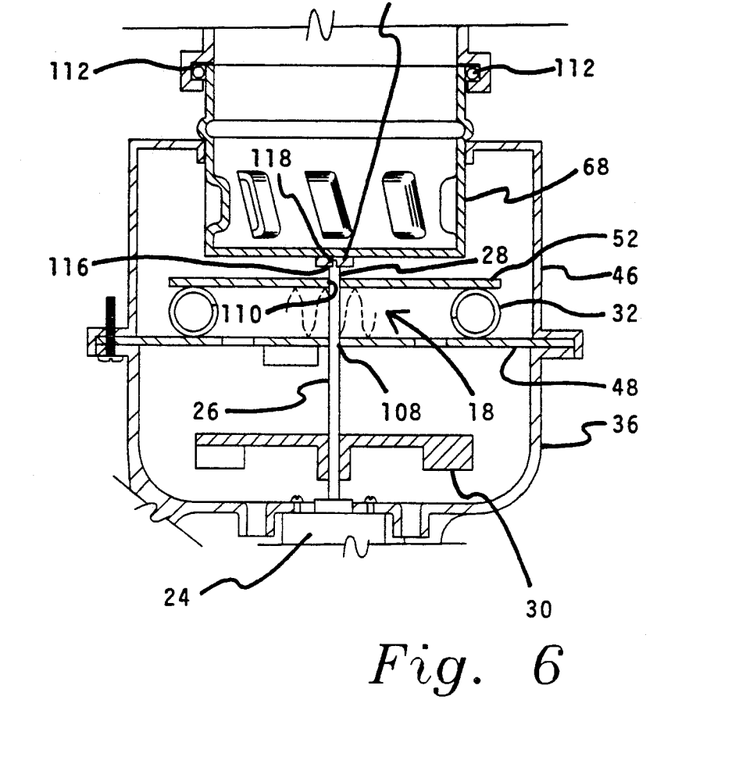
FIG. 6 illustrates a partial side elevation view, in section, of an alternate embodiment of the present invention.

In one preferred embodiment, the roasting cavity 66 is provided with rotating means 18 to aid in the agitation of the coffee beans during the roasting process. One method of rotating the cup member 68, as best shown in FIG. 6, is by orienting the cup member 68 such that a longitudinal axis thereof is coincidental to the axis of the motor shaft 26. The motor shaft 26 may then be extended to engage the bottom member 70 of the cup member 68 and thereby rotate the cup member 68 as the fan 30 is simultaneously rotated. In this embodiment, openings 108,110 are defined by the divider plate member 48 and the air flow diverting member 52, respectively, for the passage of the motor shaft 26.

A bearing means 112 may be provided to ensure close receipt of the roasting cavity 66 by the housing upper portion 46. The bearing means 112 further serves to ease the rotation of the cup member 68 with respect to the roasting assembly housing 34. In the preferred embodiment, a ball bearing-type member is carried by the housing upper portion 46 such that free rotation of the cup member 68 is allowed while otherwise unselected movement of the cup member 65 is substantially prohibited.

An engagement means 114 is provided for the engagement of the motor shaft 26 and the cup member 68. In the embodiment depicted in FIG. 6, the engagement means 114 includes a flattened portion 116 at the distal end 28 of the motor shaft 26 and a cooperating slotted member 118 carried by the bottom member 70 of the cup member 68. It will be seen that the same removability may be accomplished in the described embodiment, the cup member 68 being easily removed and replaced as described above.

A chaff collector means 20 is provided for collecting chaff forced out of the roasting cavity 66 during the roasting process. The chaff collector means 20 of the preferred embodiment includes a separator member 120 and a cover member 144. The separator member 120 serves to separate the chaff from the evacuating air, to collect the chaff, and further to allow for the evacuation of air from the improved coffee roaster 10. The cover member 144 serves to direct the chaff into the collection volume 122 of the separator member 120 and to allow for further evacuation of air from the improved coffee roaster 10.

The separator member 120 includes a lip member 124 defined by a circular wall. The lip member 124 is dimensioned to be closely received by the housing opening 106 defined to receive coffee beans. An annular wall 128 extends outwardly from the top end 126 of the lip member 124 at a substantial right angle. The annular wall 128 serves to engage a portion of the top member 104 of the housing 34 to limit the insertion of the separator member 120. An outer wall 134 extends upwardly from the outside edge 132 of the annular wall 128 at a substantial right angle. An inverted funnel member 138 extends from the lip member top edge 126 and the annular Wall inner edge 130. The inverted funnel member 138 serves to increase the speed of the evacuating air due to the reduction of the area from the first end 140 of the inverted funnel member 138 to the second end 142. The increased speed of the evacuating air thus serves to separate the evacuating air from the chaff. A collecting volume 122 is defined by the inverted funnel member 138, the annular wall 128, and the Outer wall 134. A plurality of openings 136 may be defined by the outer wall 134 for the evacuation of air from the improved coffee roaster 10. The openings 136 are dimensioned to allow the passage air while retaining a substantial portion of the chaff.

Figure 7:
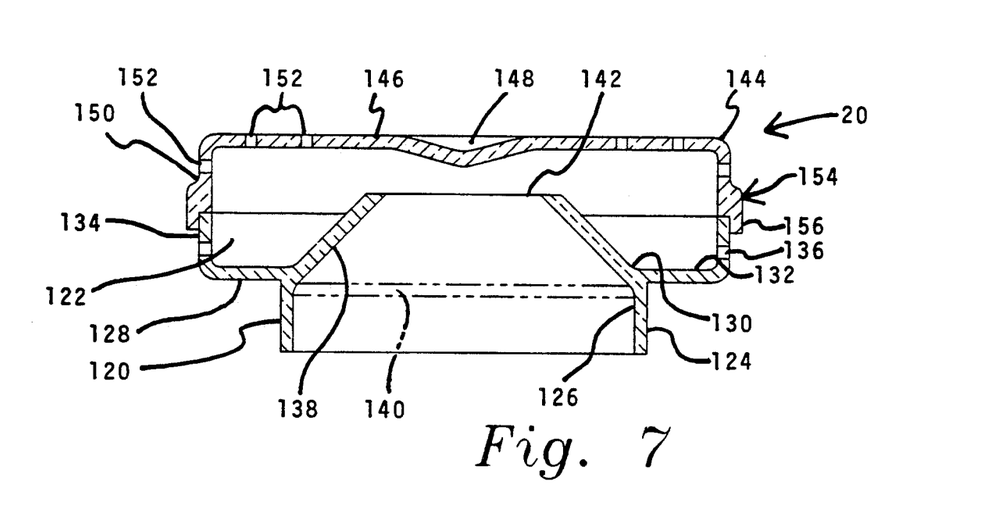
FIG. 7 illustrates a side elevation view, in section, of the chaff collector means of the present invention.

The cover member 144 is comprised of a top member 146 and a side wall member 150, the side wall member 150 having a circular configuration with a diameter substantially equal to that of the separator member outer wall 134. As shown in FIG. 2, the top member 146 may be substantially flat. However, as shown in FIG. 7, the top member 146 may define a centrally located depression 148, shown in phantom, to aid in forcing the air away from the center on the top member 146, thus increasing the collection of chaff.

A plurality of openings 152 may be defined by the top and side wall members 146,150 to provide for the evacuation of air from the improved coffee roaster 10. In the preferred embodiment, the openings 152 defined by the top member 146 are so defined around the periphery, and not directly above the upper end 142 of the separator member inverted funnel member 138. By so orienting the openings 152, the air and chaff are forced away from the opening 74 above the roasting cavity 66, thereby preventing the reentry of the chaff into the roasting cavity 66.

The combined area defined by the openings 136,152 in the separator member 120 and cover member 144, respectively, is at least equal to the combined area defined by the openings 76 defined by the roasting cavity cup member 68. In the preferred embodiment, the combined area defined by the openings 136,152 is greater than the combined area defined by the openings 76 such that the air evacuating through the inverted funnel member 138 will not create a pressure under the cover member 144 sufficient to unselectively force the cover member 144 away from the separator member 120.

An engaging means 154 may be provided for engaging the separator member 120 and the cover member 144. In the preferred embodiment, an extended portion 156 of the cover member side wall 150 defines an inside diameter such as to closely receive the outer wall 134 of the separator member 120. Thus, the cover member 144 may be selectively snapped into place and selectively removed. However, unselected removal of the cover member 144 from the separator member 120 is substantially prevented. Such separation might otherwise occur due to the force of the evacuating air, for instance.

A temperature control means 64 may be provided for limiting the temperature within the roasting assembly housing 34 to a selected temperature. If the heating means 32 were to overheat, an electrical fire could result. Overheating may result from repeated use in a short period of time, or from other unintended uses or abuses of the improved coffee roaster 10. In the preferred embodiment, a readily available thermostat may be used. As shown, the thermostat 64 is positioned under the divider plate member 48. When the improved coffee roaster 10 begins to overheat, heated air will be forced downward through openings 50. Thus, when the heated air is forced downward, the thermostat 64 will detect an increase in temperature and will automatically deactivate at least the heating means 32. It is foreseeable that the motor 24 and fan 30 may continue to operate to aid in cooling the components of the improved coffee roaster 10.

A timing means 158 may be provided for several purposes. First, the timing means 158 can control the roasting time such that each load of coffee may be roasted to a consistent degree. The timing means 158 may have variable time limits such that the user may experiment until the desired roasting time is discovered. The timing means 158 can then be set to this selected time each roasting cycle. Further, the timing means 158 serves to limit the roasting time to prevent overheating from prolonged usage. In the preferred embodiment, the timing means 158 limits the roasting time to one to five minutes. Any conventional timing means may be used. In the preferred embodiment, the timing means 158 is carried by the housing 16 as shown in the figures.

A power switch 160 is provided for the selective activation of the electrical components of the improved coffee roaster 10. The function of the power switch 160 may be incorporated as a function of the timing means 158, or the power switch 160 may act in cooperation therewith. As shown, in the preferred embodiment, the timing means 158 also acts as a power switch 160.

A gripping means 162 is provided for the ease of lifting and tilting the improved coffee roaster 10. It can be seen that the coffee beans are evacuated from the preferred embodiment by tilting the improved coffee roaster 10. It can also be seen that the preferred embodiments heretofore described are compact and lightweight such that tilting is made possible. The gripping means 162 of the preferred embodiment includes a pair of recesses 164 defined by the housing 16. The recesses 164 are defined on opposing sides of the housing 16 to facilitate gripping. Though not shown, other handles may be incorporated. It will be understood that the gripping means 162 depicted is merely a design preference and such disclosure is not intended to limit the handle to such a configuration.

From the foregoing description, it will be recognized by those skilled in the art that an improved coffee roaster offering advantages over the prior art has been provided. Specifically, the improved coffee roaster provides a means for roasting a selected volume of coffee beans in a relatively quick and efficient manner.

When a pot of coffee is desired, a selected volume of green coffee beans may be introduced into the roasting cavity of the improved coffee roaster and the timing means activated. Upon activation of the timing means, a heating coil is energized and a motor is activated. The motor drives a fan, which forces air through the heating coil and toward the roasting cavity. Slots defined by the roasting cavity direct the heated air into the roasting cavity such that the coffee beans are agitated and roasted. As chaff is produced, it is evacuated with the air through the opening in the top of the roasting cavity. A chaff collector is provided for collecting the chaff evacuated while allowing the escape of air.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A device for roasting coffee beans, said device being operable for roasting a small quantity of said coffee beans for a selected period of time using air as a preferred heat transfer medium, said device comprising:
   a housing;
   an air inductor carried by said housing for inducting said air through said device;
   a heater carried by said housing for heating said air to a selected temperature for roasting said coffee beans;
   a coffee bean receptacle carried by said housing for retaining said coffee beans while roasting, said coffee bean receptacle defining a substantial cup configuration including a bottom member and a side wall member, said bottom member defining a substantially flat configuration, said side wall member defining a plurality of openings for receiving said air heated by said heater, said heated air subsequently being evacuated through an opening defined at an upper portion of said side wall, each of said plurality of openings defined by said side wall member being oriented to initially direct said air in a downward helical pattern to agitate said coffee beans to insure thorough roasting, to reduce said selected period of time, and to inhibit said chaff to evacuate said coffee bean receptacle;
   a chaff collector for collecting a substantial portion of chaff produced while said coffee beans are subjected to said heated air, said chaff collector being carried by said housing and positioned such that said air is evacuated therethrough, said chaff collector being selectively removable from said housing, said chaff collector including a separator member through which said air and said chaff are evacuated, said separator member serving to separate said chaff from said air, said chaff being directed in a first direction and deposited in a chaff reservoir carried by said chaff collector, said air being directed in a second direction away from said first direction and out of said chaff collector; and
   at least one vent for allowing the escape of said air from said coffee bean receptacle.

2. The device of claim 1 further comprising a chaff screen for preventing any portion of said chaff from passing through said coffee bean receptacle openings and toward said heater, said chaff being produced while said coffee beans are subjected to said heated air and not being evacuated from said coffee bean receptacle.

3. The device of claim 1 further comprising a timer for selecting and limiting said selected period of time for roasting said coffee beans.

4. The device of claim 1 further comprising a temperature sensor for detecting a temperature within said housing in relation to said selected temperature, said temperature sensor serving to deactivate at least said heater when said temperature within said housing is greater that said selected temperature.

5. The device of claim 1 wherein said coffee bean receptacle is selectively removable.

6. The device of claim 1 wherein said coffee bean receptacle is selectively rotated to inhibit agitation of said coffee beans.

7. The device of claim 1 further comprising at least one handle for selectively gripping said device to facilitate emptying said coffee beans from said coffee bean receptacle and for selectively moving said device.

8. The device of claim 10 wherein said coffee bean receptacle bottom member defines a selected diameter and said coffee bean receptacle side wall member defines a selected height, said bottom member height being proportionally smaller than said side wall member diameter.

9. The device of claim 1 wherein said coffee bean receptacle bottom member defines a selected diameter and said coffee bean receptacle side wall member defines a selected height, said bottom member height being proportionally smaller than said side wall member diameter.

10. A device for roasting coffee beans, said device being operable for roasting a small quantity of said coffee beans for a selected period of time using air as a preferred heat transfer medium, said device comprising:
  a housing;
  an air inductor carried by said housing for inducting said air through said device;
  a heater carried by said housing for heating said air to a selected temperature for roasting said coffee beans;
  a coffee bean receptacle carried by said housing for retaining said coffee beans while roasting, said coffee bean receptacle defining a substantial cup configuration including a bottom member and a side wall member, said bottom member defining a substantially flat configuration, said side wall member defining a plurality of openings for receiving said air heated by said heater, said heated air subsequently being evacuated through an opening defined at an upper portion of said side wall, each of said plurality of openings defined by said side wall member being oriented to initially direct said air in a downward helical pattern to agitate said coffee beans to insure thorough roasting, to reduce said selected period of time, and to inhibit said chaff to evacuate said coffee bean receptacle;
  a chaff collector for collecting a substantial portion of chaff produced while said coffee beans are subjected to said heated air, said chaff collector being carried by said housing and positioned such that said air is evacuated therethrough, said chaff collector being selectively removable from said housing, said chaff collector including a separator member through which said air and said chaff are evacuated, said separator member serving to separate said chaff from said air, said chaff being directed in a first direction and deposited in a chaff reservoir carried by said chaff collector, said air being directed in a second direction away from said first direction and out of said chaff collector;
  at least one vent for allowing the escape of said air from said coffee bean receptacle;
  a timer for selecting and limiting said selector period of time for roasting said coffee beans; and
  a temperature sensor for detecting a temperature within said housing in relation to said selected temperature, said temperature sensor serving to deactivate at least said heater when said temperature within said housing is greater than said selected temperature.

11. The device of claim 10 further comprising a chaff screen for preventing any portion of said chaff from passing through said coffee bean receptacle openings and toward said heater, said chaff being produced while said coffee beans are subjected to said heated air and not being evacuated from said coffee bean receptacle.

12. The device of claim 10 wherein said coffee bean receptacle is selectively removable.

13. The device of claim 10 wherein said coffee bean receptacle is selectively rotated to inhibit agitation of said coffee beans.

14. The device of claim 10 further comprising at least one handle for selectively gripping said device to facilitate emptying said coffee beans from said coffee bean receptacle and for selectively moving said device.

15. A device for roasting coffee beans, said device being operable for roasting a small quantity of said coffee beans for a selected period of time using air as a preferred heat transfer medium, said device comprising:
  a housing;
  an air inductor carried by said housing for inducting said air through said device;
  a heater carried by said housing for heating said air to a selected temperature for roasting said coffee beans;
  a coffee bean receptacle carried by said housing for retaining said coffee beans while roasting, said coffee bean receptacle defining a substantial cup configuration including a bottom member and a side wall member, said bottom member defining a substantially flat configuration having a selected diameter, said side wall member defining a plurality of openings for receiving said air heated by said heater, said side wall member defining a selected height, said heated air subsequently being evacuated through an opening defined at an upper portion of said side wall, each of said plurality of openings defined by said side wall member being oriented to initially direct said air in a downward helical pattern such that said coffee beans are agitated to insure thorough roasting, to reduce said selected period of time, and to inhibit said chaff to evacuate said coffee bean receptacle, said diameter of said bottom member being proportionally smaller than said side wall height;
  a chaff collector for collecting a substantial portion of chaff produced while said coffee beans are subjected to said heated air, said chaff collector being carried by said housing and positioned such that said air is evacuated therethrough, said chaff collector being selectively removable from said housing, said chaff collector including a separator member through which said air and said chaff are evacuated, said separator member serving to separate said chaff from said air, said chaff being directed in a first direction and deposited in a chaff reservoir carried by said chaff collector, said air being directed in a second direction away from said first direction and out of said chaff collector;

at least one vent for allowing the escape of said air from said coffee bean receptacle;

a timer for selecting and limiting said selected period of time for roasting said coffee beans;

a temperature sensor for detecting a temperature within said housing in relation to said selected temperature, said temperature sensor serving to deactivate at least said heater when said temperature within said housing is greater than said selected temperature;

at least one handle gripping means for selectively gripping said device to facilitate emptying said coffee beans from said coffee bean receptacle and for selectively moving said device; and a chaff screen for preventing any portion of said chaff from passing through said coffee bean receptacle openings and toward said heater, said chaff being produced while said coffee beans are subjected to said heated air and not being evacuated from said coffee bean receptacle.

16. The device of claim 15 wherein said coffee bean receptacle is selectively removable.

17. The device of claim 15 wherein said coffee bean receptacle is selectively rotated to inhibit agitation of said coffee beans.

* * * * *